United States Patent [19]
Hsieh et al.

[11] Patent Number: 5,719,386
[45] Date of Patent: Feb. 17, 1998

[54] HIGH EFFICIENCY MULTI-IMAGE SCAN METHOD

[75] Inventors: Michael Hsieh; Raymond Huang, both of Hsin-Chu, Taiwan

[73] Assignee: Umax Data Systems, Inc., Hsinchu, Taiwan

[21] Appl. No.: 597,666

[22] Filed: Feb. 7, 1996

[51] Int. Cl.⁶ .................................................. G06K 7/10
[52] U.S. Cl. ............................................ 235/470; 235/471
[58] Field of Search ................................. 235/379, 380, 235/471, 470

[56] References Cited

U.S. PATENT DOCUMENTS

| | | | |
|---|---|---|---|
| 4,736,109 | 4/1988 | Dvorzsak | 235/471 |
| 4,760,247 | 7/1988 | Krane et al. | 235/471 |
| 4,776,464 | 10/1988 | Miller | 235/471 |
| 5,410,620 | 4/1995 | Yoshida | 235/495 |
| 5,588,072 | 12/1996 | Wang | 235/495 X |
| 5,610,995 | 3/1997 | Zheng et al. | 235/462 |
| 5,612,524 | 3/1997 | Saint Anselmo | 235/494 |

Primary Examiner—Harold Pitts
Attorney, Agent, or Firm—W. Wayne Liauh

[57] ABSTRACT

A high efficiency multi-image scanning method is disclosed. It involves the use of a special scanning window, or panel, containing a plurality of rectangular fields provided therein. The scanning window also contains a plurality of fiducial marks which associates each rectangular field, respectively, with a pre-defined location relative to the fiducial mark and a pre-defined scanning area. Prior to the scanning operation, a plurality of documents to be scanned are placed inside the rectangular fields. A pre-scan operation is performed to find and identify the fiducial mark. Then the scanner is moved to a selected rectangular field according to the information contained in the fiducial mark to scan an image having the pre-defined scanning area. Optionally, the method further contains the step of determining whether an image is present in the rectangular field, and if so, then adjusting the scanning area to compensate for any inadvertent misplacement of the image in the rectangular field.

9 Claims, 7 Drawing Sheets

XXXXX
XXOXX
XOOOX
XXOXX
XXXXX

HIGH EFFICIENCY MULTI-IMAGE SCAN METHOD

BACKGROUND OF THE INVENTION

1. Field of the Invention

This invention relates to a method for making high efficiency multi-image scans, especially to a method of scanning multiple document images with automatic image detection and scanning field adjustment in one single scanning operation.

2. Description of the Prior Art

Image scanner is widely used in offices and by individuals for document processing in the modern society. The performance of a scanner strongly affects the work efficiency of the user. The design of the operation mode of the scanner is of vital importance for its performance.

The operation mode used today in a generic image scanner is to scan one image per operation. The user would have to repeat this operation if he (she) ever wants to scan more than one image document.

This is time-consuming process and lowers the scanning efficiency. Moreover, if the original page is mispositioned or shifted, the quality of the scanning result will be affected severely.

SUMMARY OF THE INVENTION

The main purpose of this invention is to provide a method for making highly efficient, multi-image scannings. The method disclosed in the present invention is to define a window region and insert a number of rectangular fields inside for placing multiple images. The scanning of multiple images can be completed in a single scan operation, and the computer program recognizes the existence and orientation of images in each field. The scanner will also adjust the position the scanning field if there is deviation of the image from the desired area. Furthermore, the method disclosed in the present invention involves the use of a plurality of fiducial marks outside the rectangular fields that can be recognized by the computer to facilitate searching of the image position, so as to provide a convenient document processing by the user.

DETAILED DESCRIPTION

Figure 1:
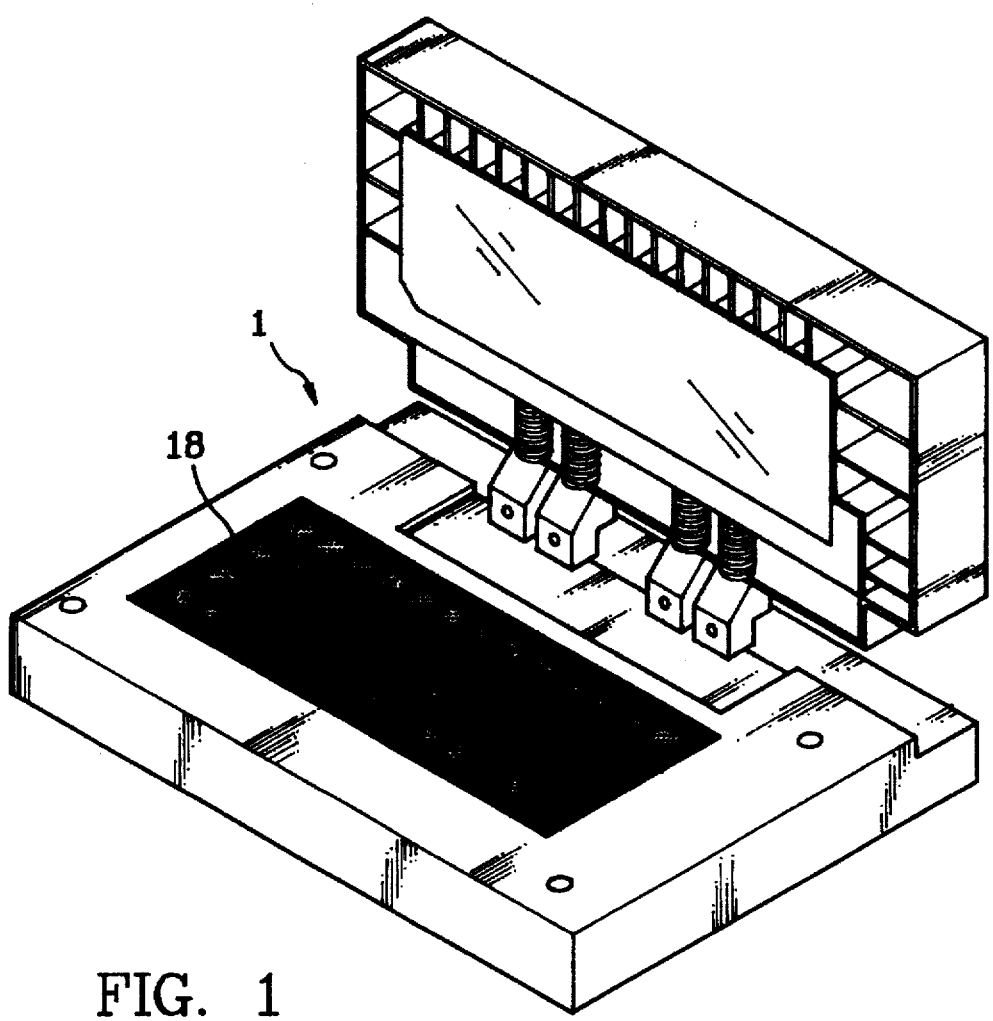
FIG. 1 shows an illustrative drawing of the window which is put on the scanner.

FIG. 1 shows an illustrative drawing of the window (18) which is put on the conventional scanner (1).

Figure 2:
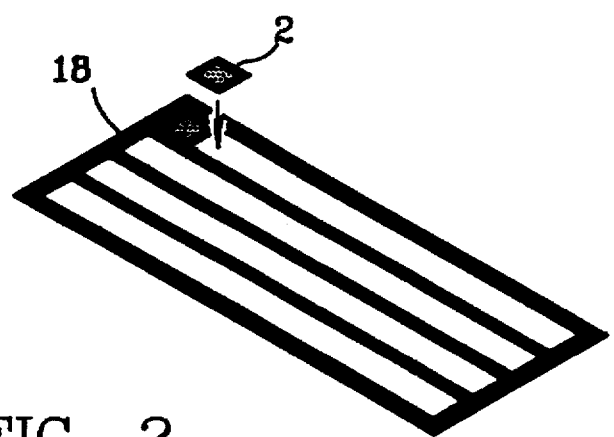
FIG. 2 shows an illustrative drawing of the images which is put on the window of this invention.

FIG. 2 shows an illustrative drawing of the image (2) which is put on the window (18) of this invention.

Figure 3:
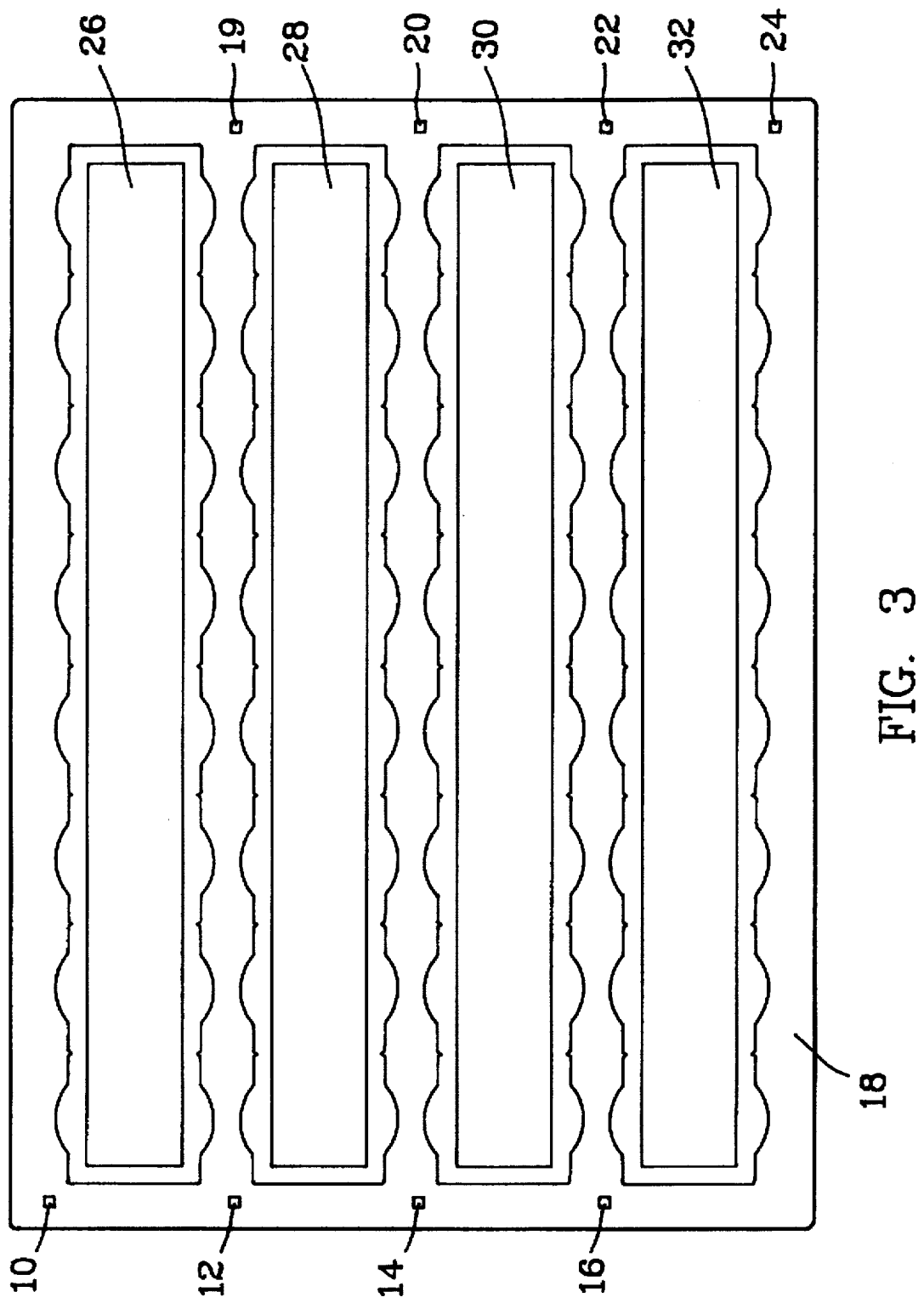
FIG. 3 is the window region according to a preferred embodiment of this invention.

FIG. 3 shows the window region according to a preferred embodiment of this invention. Its design is to set multiple rectangular fields (26), (28), (30) and (32) in a window (18). Fiducial marks (10), (12), (14) and (16) are located outside the upper left corner of each rectangular box. For this to be useful even after a 180 degree rotation, another set of fiducial marks (19), (20), (22) and (24) are located outside the lower right corner of the rectangular boxes (26), (28), (30) and (32), symmetrically. Computer program recognizes those fiducial marks automatically. Only one pair of fiducial marks is needed if the rectangular fields are set with equal distance between each other. The position of the other rectangular fields can be found be shifting the scan field with given distance.

Figures 4, 5:
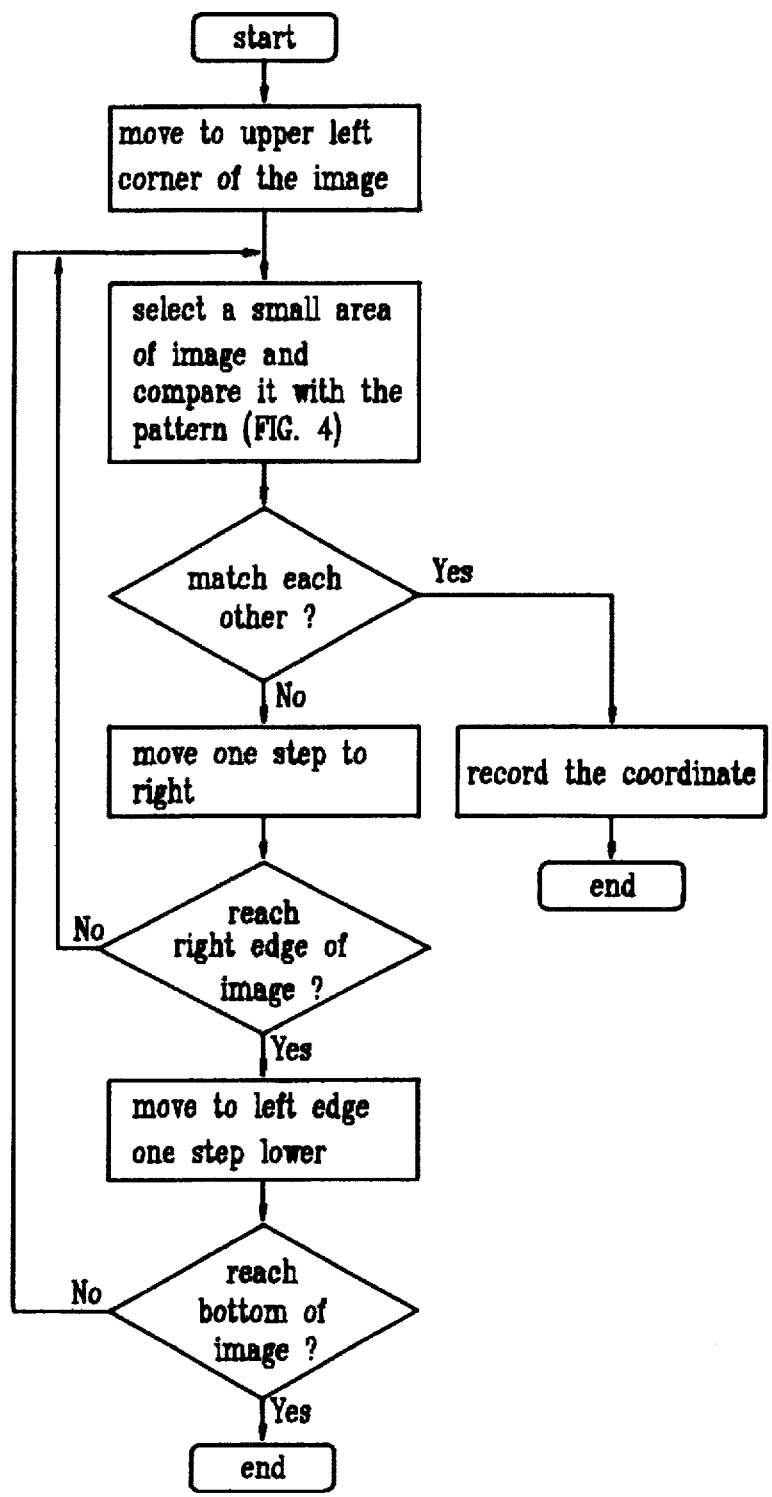
FIG. 4 shows the fiducial marks according to a preferred embodiment of this invention.
FIG. 5 is the flow chart of the fiducial mark recognition program according to a preferred embodiment of this invention.

As shown in FIG. 4, the design of the fiducial marks in this embodiment is a small square hole. During scanning operation, a black signal is received when there is obstruction to the light transmission, and a white signal is got when the light passes through the hole. In FIG. 4, an "X" indicates a black point and an "O" indicates a white point. The pattern in the figure is an example showing the signal after scanning a small round white hole on a black background, this example is shown in a square matrix to simplify the operation of the scanner.

FIG. 5 illustrates the flow chart of the fiducial marks recognizing program, i.e. the algorithm used to find the fiducial marks. The main function is to select a small area of the image and compare with the pattern of the white hole in black background (see FIG. 4), starting at the upper left corner of the image. If the patterns match each other, the coordinates of this position are recorded then terminate the job. If not, move the selection area right in one step, and repeat the comparison until the right edge of the image is encountered. Then the selection area is moved down in one step and repeat the moving and comparing until a matched pattern is found or the lower edge of the image is encountered.

Figure 6:
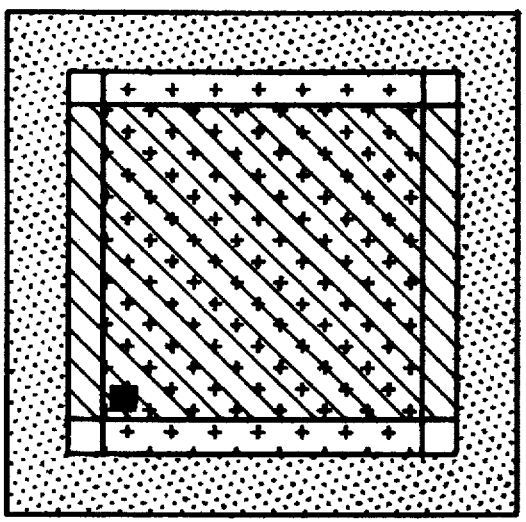
FIG. 6 shows the recognition of the existence of the image according to a preferred embodiment of this invention.

As shown in FIG. 6, the recognition of the existence of the document image is achieved by detecting the point in the upper left corner of the image field. The gray level of the detecting point is compared with a given gray level, called threshold value. If the gray level of the detection point is greater than the threshold value, there is no document; otherwise, if the gray level of the detection point is less than the threshold value, a document is present.

Figure 7:
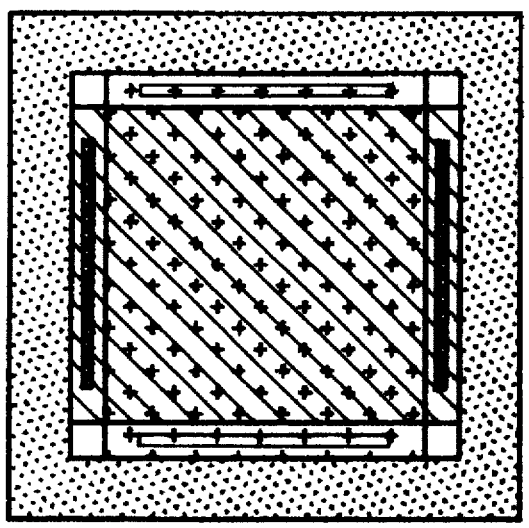
FIG. 7 shows the recognition oft he orientation oft he image according to a preferred embodiment of this invention.

As shown in FIG. 7, the detection of the orientation of the image is achieved by comparing the average gray level of the left and right edges, with average gray level of the upper and lower edges. If the average gray level is high, this further means that an image is present in this area.

Figure 8:
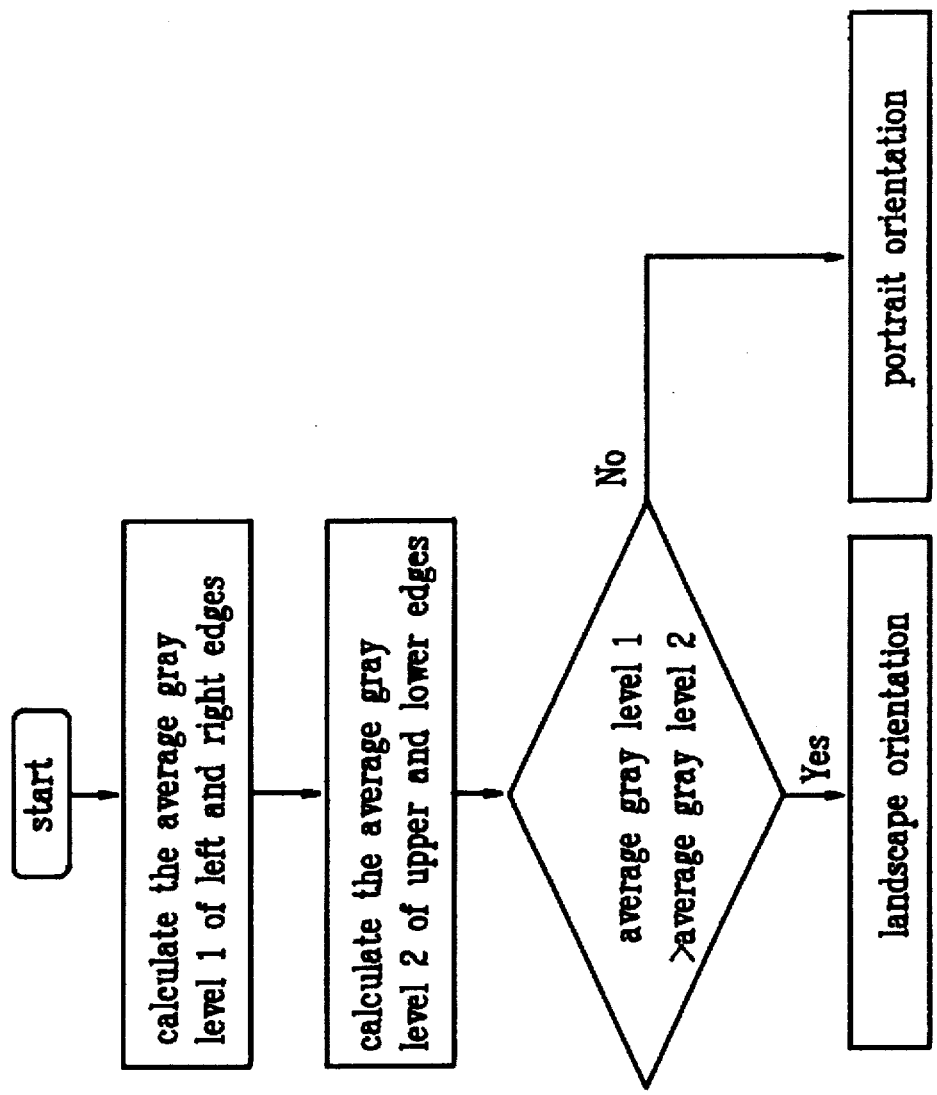
FIG. 8 is the flow chart of the image orientation recognition program according to a preferred embodiment of this invention.

The complete operation is shown FIG. 8, the flow chart of the program detection of the orientation of the image. It starts by calculating the average gray level of the left and right edges, then calculating the average gray level of the upper and lower edges, then compare these two averages. The document is determined to be in the portrait orientation if the average gray level of the left and right edges is less than that of the upper and lower edges. Otherwise, the document is in a landscape orientation, if the average gray level of the left and right edge is higher than that of the upper and lower edges.

Figure 9:
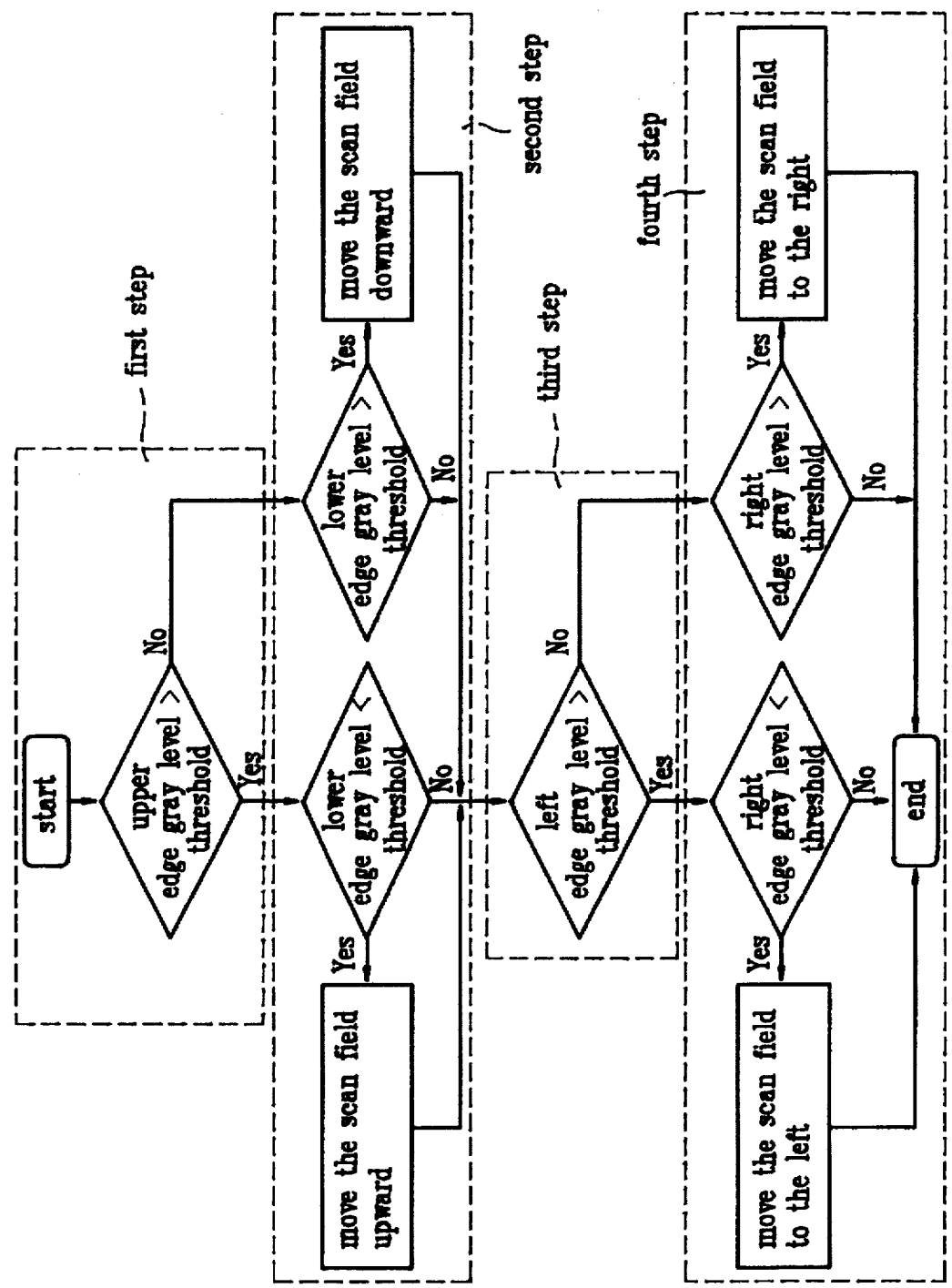
FIG. 9 is the flow chart of the scan field adjustment program according to a preferred embodiment of this invention.

As shown in FIG. 9, the flow chart of the program for adjusting the scan field consists of four steps. The main function is to select certain area around the image to detect the gray level there and use these to adjust the scan field to avoid the shifting of the scanned image. The first step is to detect the gray level of the upper edge of the selected field and compare it with a given threshold value. In second step, compare the gray level of the lower edge with the threshold value. If the upper edge gray level is less than the threshold value while that of the lower edge is greater than threshold value, move the field downward and go to the third step. If the upper edge gray level is greater than the threshold value while that of the lower edge is less than threshold value, move the field upward and go to the third step. Otherwise, do nothing and proceed to the third step. In the third step, compare the gray level of the left edge of the field with the threshold value. In the forth step, compare the right edge gray level with the threshold value. If the left edge gray level is less than threshold value while that of the fight edge is greater than threshold value, move the field to the fight and terminate the program. If the left edge gray level is greater than the threshold value while that of the fight edge is less than threshold value, move the field to the left and terminate the program. Otherwise, do nothing and end the program.

Figure 10:
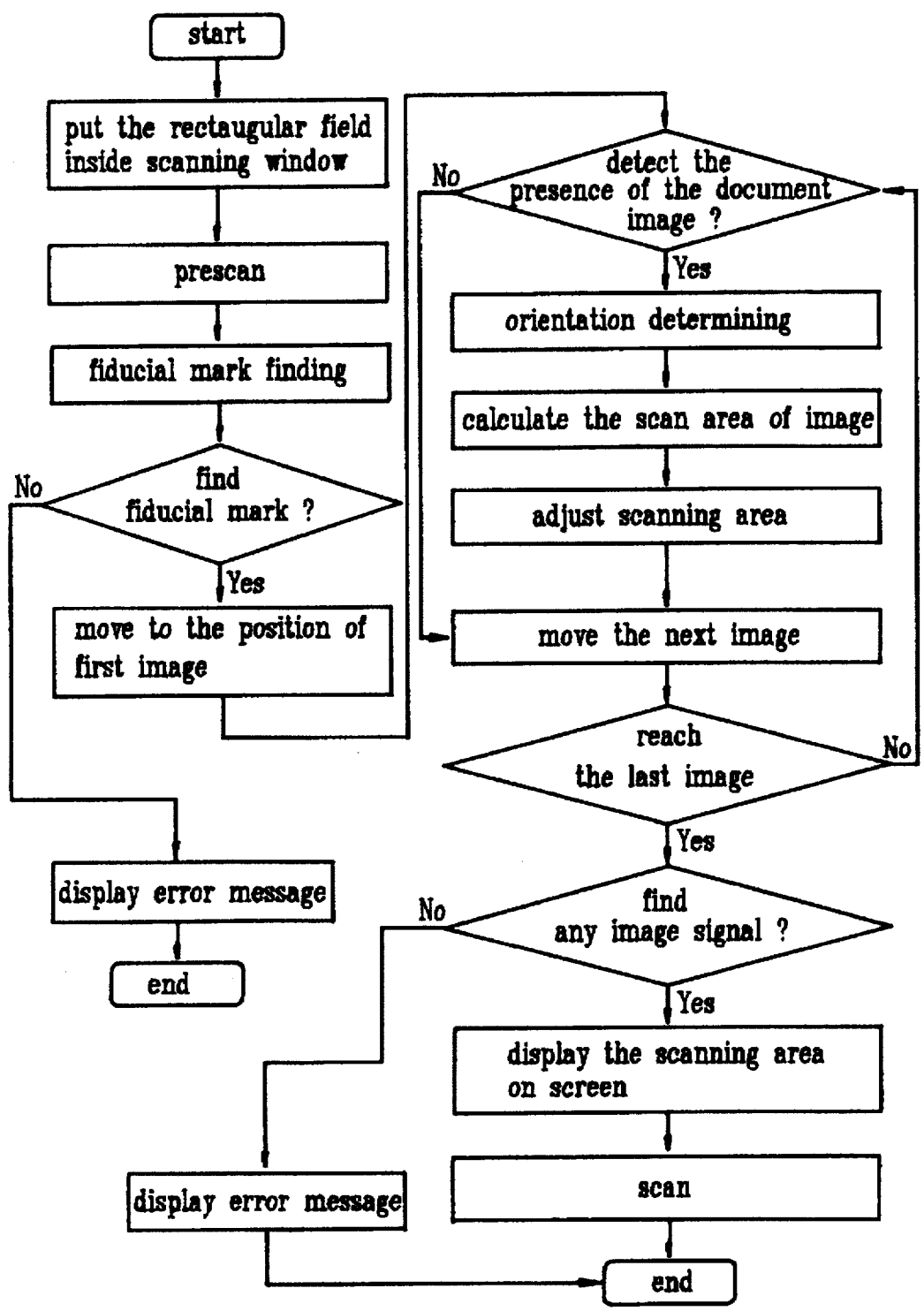
FIG. 10 is the flow chart of the whole operation in the embodiment of this invention.

As shown in FIG. 10, the flow chart of the whole scanning operation starts by placing the rectangular fields in the scan window of the scanner. Then scan the area and search for the fiducial marks, if it fails to find the fiducial marks, display an error message and terminate the scan process. Otherwise, move to the first scan field and detect the presence of the document image. If there is no image found, then proceed to the nest scan field. Otherwise, determine the orientation of the document and adjust the scan field to compensate the shifting of the scanned image. Then move to the next scan field and repeat these procedures until the last field is complete. Finally, display the scan fields on the screen and start the scanning operation. The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

We claim:

1. A high efficiency multi-image scan method, comprising the steps of:
   (a) obtaining a window having a plurality of rectangular fields provided therein, said window also having at least a fiducial mark wherein said fiducial mark associates said rectangular field with a pre-defined location relative to said fiducial mark as well as a pre-defined area to be scanned;
   (b) placing said window containing at least one document to be scanned on a scanner containing a scanning means;
   (c) performing a pre-scan operation;
   (d) finding and identifying a fiducial mark;
   (e) moving said scanning means to a selected rectangular field associated with said fiducial mark to scan an image contained in said selected rectangular field;
   (f) repeating steps (d) and (e) until no more rectangular field is to be scanned.

2. The high efficiency multi-image scan method according to claim 1 which further comprises the step of determining whether an image is present in said selected rectangular field by measuring the gray level of a selected point in said selected rectangular field.

3. The high efficiency multi-image scan method according to claim 1 which further comprises the step of determining the orientation of an image present in said selected rectangular field.

4. The high efficiency multi-image scan method according to claim 3 wherein the step of determining the orientation of said image present in said selected rectangular field is achieved by calculating the average gray level of the left and right edges of said image and the average gray level of the upper and lower edges of said image, and comparing these two average gray levels.

5. The high efficiency multi-image scan method according to claim 1 which further comprises the step of shifting the area to be scanned in said rectangular field.

6. The high efficiency multi-image scan method according to claim 5 wherein said the step of shifting the area to be scanned in said rectangular field comprises the sub-steps of:
   (a) calculating the average gray level of the upper edge of said image contained in said rectangular field, and comparing the calculated average gray level of the upper edge with a first predetermined threshold value;
   (b) calculating the average gray level of the lower edge of said image contained in said rectangular field, and comparing the calculated average gray level of the lower edge with a second predetermined threshold value;
   (c) if the calculated average gray level of the upper edge is greater than said first predetermined threshold value, and the calculated average gray level of the lower edge is lower than said second predetermined threshold value, then move said area to be scanned upward by one scanning unit; otherwise, performing next steps;
   (d) calculating the average gray level of the left edge of said image contained in said rectangular field, and comparing the calculated average gray level of the left edge with a third predetermined threshold value;
   (e) calculating the average gray level of the right edge of said image contained in said rectangular field, and comparing the calculated average gray level of the right edge with a fourth predetermined threshold value;
   (f) if the calculated average gray level of the left edge is greater than said third predetermined threshold value, and the calculated average gray level of the right edge is lower than said second predetermined threshold value, then move said area to be scanned leftward by one scanning unit.

7. The high efficiency multi-image scan method according to claim 1 wherein said window contains diagonally symmetrical fiducial marks.

8. The high efficiency multi-image scan method according to claim 7 wherein said window contains identical rectangular fields and only a pair of diagonally symmetrical fiducial marks.

9. The high efficiency multi-image scan method according to claim 1 wherein said window contains identical rectangular fields and only one fiducial mark.

* * * * *